United States Patent [19]

Barlow et al.

[11] Patent Number: 4,839,800
[45] Date of Patent: Jun. 13, 1989

[54] DATA PROCESSING SYSTEM WITH A FAST INTERRUPT

[75] Inventors: George J. Barlow, Tewksbury, Mass.; James W. Keeley, Nashua, N.H.

[73] Assignee: BULL HN Information Systems Inc., Billerica, Mass.

[21] Appl. No.: 901,847

[22] Filed: Aug. 29, 1986

[51] Int. Cl.[4] .............................................. G06F 13/00
[52] U.S. Cl. ................................ 364/200; 364/230.2; 364/229.2; 364/270.7; 364/241.2; 364/941.6
[58] Field of Search ... 364/200 MS File, 900 MS File

[56] References Cited

U.S. PATENT DOCUMENTS

| | | | |
|---|---|---|---|
| 3,947,824 | 3/1976 | Doehle et al. | 364/900 |
| 4,035,780 | 7/1977 | Kristick | 364/900 |
| 4,148,011 | 4/1979 | McLagan et al. | 364/900 |
| 4,374,414 | 2/1983 | Comfort et al. | 364/200 |
| 4,417,302 | 11/1983 | Chimienti et al. | 364/200 |
| 4,420,806 | 12/1983 | Johnson, Jr. et al. | 364/200 |
| 4,470,111 | 9/1984 | Jenkins | 364/200 |

Primary Examiner—Gareth D. Shaw
Assistant Examiner—Adolfo Ruiz
Attorney, Agent, or Firm—George Grayson; John S. Solakian; Lewis P. Elbinger

[57] ABSTRACT

A multiprocessor system includes a number of subsystems all coupled in common to an asynchronous system bus. Apparatus is included in the system bus interface logic of each processing subsystem to receive commands from the system bus and compare the interrupt priority level of the new command with the current command being executed. If the new command has a lower interrupt priority than the current command, then the subsystem sending the command will receive a not acknowledge response from the processing system. The apparatus is responsive to certain control signals from the new command to bypass the interrupt priority comparison logic and initiate an immediate interrupt regardless of the interrupt priority level of the current command being executed by the processing subsystem. The processing subsystem may also generate a command to itself via the system bus which requires the high speed interrupt.

12 Claims, 6 Drawing Sheets

MULTI PROCESSING SYSTEM / INTERFACE

MULTIPROCESSING SYSTEM / INTERFACE

SHEET 2 of 2
BUS INTERFACE LOGIC

CONTROL BUS 2-2 SIGNALS

| B S M R E F | B S S H B C | B S Y E L 0 | B S R I N T | |
|---|---|---|---|---|
| 0 | 0 | 0 | 0 | NORMAL INTERRUPT |
| 0 | 0 | 0 | 1 | CPU LEVEL CHANGE INTERRUPT |
| 0 | 0 | 1 | 0 | HIGH SPEED INTERRUPT |
| 0 | 0 | 1 | 1 | RESET HIGH SPEED INTERRUPT BUSY |

BSAD 00-07   DON'T CARE WITH GOOD PARITY
BSAD 08-17   CHANNEL NUMBER OF DESTINATION
BSAD 18-23   FUNCTION CODE   (BSAD 18 = 1 FOR HIGH SPEED INTERRUPT)

BSDT 00-09   CHANNEL NUMBER OF SOURCE
             (BSDT 9 = 1 FOR RESET HIGH SPEED INTERRUPT BUSY)
BSDT 10-15   LEVEL NUMBER IF BSYEL0 = 0
BSDT 16-31   DON'T CARE WITH GOOD PARITY

COMMAND SIGNALS

*FIG. 4*

DATA PROCESSING SYSTEM WITH A FAST INTERRUPT

RELATED APPLICATIONS

The following patent applications are assigned to the same assignee as the instant application, and have related subject matter:

U.S. patent application entitled, "System Management Apparatus for a Multiprocessor System", with inventors George J. Barlow, Elmer W. Carroll, James W. Keeley, Wallace A. Martland, Victor M. Morganti, Arthur Peters and Richard Zelley, having Ser. No. 869,164, and filed on May 30, 1986;

U.S. patent application entitled, "Apparatus and Method for Interprocessor Communication", with inventors Victor M. Morganti, Patrick E. Prange, James B. Geyer and George J. Barlow, having Ser. No. 869,147, and filed on May 30, 1986; and U.S. Pat. No. 4,802,087 entitled, "Multiprocessor Level Change Synchronization Apparatus", with inventors James W. Keeley and George J. Barlow, issued on Jan. 31, 1989.

BACKGROUND OF THE INVENTION

1. Field of Use

This invention pertains to data processing systems and more particularly to interrupt apparatus utilized in conjuncton with such systems.

2. Description of the Prior Art

As is well known, many systems have processing units which employ interrupt apparatus for servicing interrupts from competing devices on a priority basis. Normally, this is achieved by assigning priority interrupt levels to the competing devices which are compared for enabling the device having the higher priority interrupt gain access to the system or processing unit. After the device's request has been serviced, the processing unit sends out a signal to the devices for indicating its readiness to service new interrupts at the current interrupt level. An example of this type of system is disclosed in U.S. Pat. No. 3,984,820.

U.S. Pat. No. 4,371,928 discloses a data processing system wherein the interrupt command includes a priority level of the source. This would present the problem of possibly not being able to respond quickly to the current command if another command of higher priority were received from the asynchronous system bus.

U.S. Pat. No. 3,993,981 describes a system including comparator means for comparing the interrupt level of the command being executed with a new command received over the system bus.

Today's more sophisticated multiprocessing systems, however, must be able to respond quickly to commands which indicate out of tolerance environmental conditions or certain time out conditions to allow for the orderly shutdown of the system. Also, certain of the time out conditions may require a rapid real time change in the software processes being executed than was heretofore possible. This is a particular requirement when many peripheral controllers are each requesting access to the CPU's at approximately the same time

OBJECTS OF THE INVENTION

Accordingly, it is a primary object of the present invention to provide an improved interrupt apparatus for use on a multiprocessing system.

It is a further object of the present invention to provide an interrupt apparatus which operates at normal speed and at high speed.

SUMMARY OF THE INVENTION

The above objects and advantages of the invention are achieved in a preferred embodiment of a multiprocessing system. According to the present invention, apparatus is included within the interrupt logic of the bus interface circuits of each processing unit of the system which connects through such interface circuits to an asynchronous system bus in common with the remaining units of the system to react to normal and high speed interrupt requests In normal operation, commands including address signals, data signals and control signals are transferred over the system bus. Each processing unit receives each command, certain control and address signals to determine if it should execute the command. The processing unit which recognizes the decoded address signals as its unique channel number will then compare the interrupt priority level of the current command being executed by the processing unit with the interrupt priority level of the new command. If the new command has a higher priority level then the processing unit will send an acknowledge signal out on the system bus to the source unit which initiated the command and begin executing the new command. If the new command has a lower interrupt priority level than the command being executed, then the processing unit will send a not acknowledge signal out on the system bus. The source unit will again send the command to the processing unit after a delay.

However, certain commands, particularly those that indicate an over temperature condition, an out of specification power condition, or certain time out conditions require that the processing unit take immediate action. These commands will have particular control and address signals indicating that an immediate execution of the command is necessary and the current command being executed will be interrupted and the new command will be executed by the addressed processing unit.

Certain control and address signals are applied to array logic. The control signals indicate that the command is not a response to a previous command, that it is not a level change command, that the address signals include a channel number and that this is a normal or a high speed interrupt command.

Output signals from the array logic enable the level comparison logic to initiate either the acknowledge signal or the not acknowledge signal for transfer over the system bus for the command requiring the normal interrupt.

For the high speed operation, other output signals from the array logic bypass the level comparison logic to initiate either the acknowledge or the not acknowledge signal.

Two processing units may be included in a single central subsystem which is coupled to the asynchronous system bus by a single interface. In this case, the array logic would decode the address signals representing the channel number to indicate which processing unit is responding to the command and initiate the level comparison bypass logic for the fast response or to use the level comparison logic for the normal response.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 4. is the format of commands utilized by the apparatus of the present invention.

DESCRIPTION OF THE PREFERRED EMBODIMENT

Figure 1:
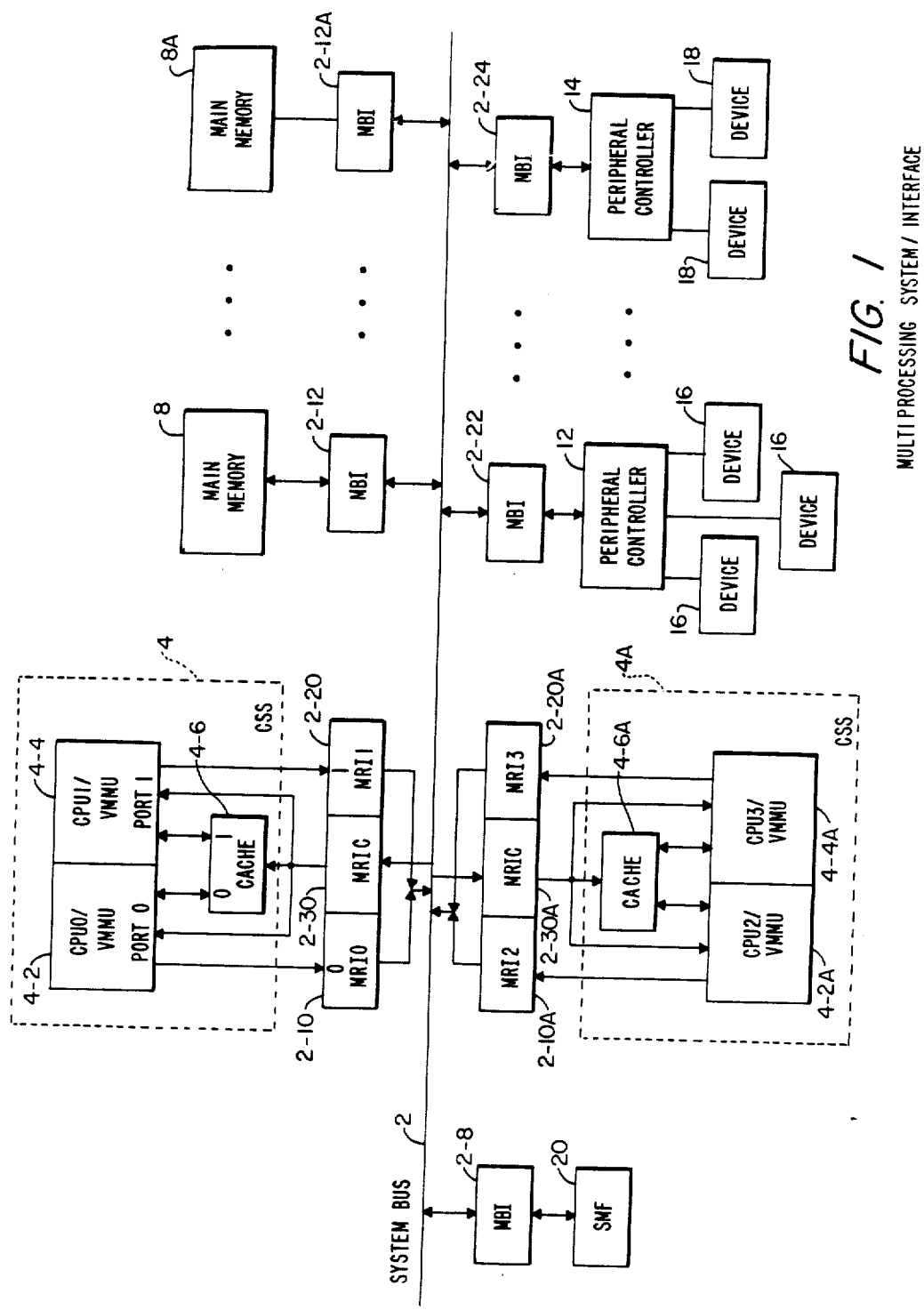
FIG. 1 is a block diagram of a system which includes the apparatus of the present invention.

FIG. 1 shows a multiprocessing system 1 which includes a number of subsystems, each coupled to an asynchronous system bus 2 via a separate interface.

These subsystems include a central subsystem (CSS) 4, coupled to system bus 2 via interfaces MRI0 2-10, MRIC 2-30 and MRI1 2-20; and a central subsystem (CSS) 4A coupled to system bus 2 via interfaces MRI2 2-16A, MRIC 2-30A and MRI3 2-20A. Interface MRI0 2-10 is identified as port 0 and interface MRI1 2-20 is identified as port 1. Interface MIRC 2-30 provides registers common to both Port 1 and Port 2. Only 2 CSSp3 s are shown, but it is understood that any number of CSSp's may be coupled to system bus 2 by their respective interfaces. Each of the interface areas include bus interface logic circuits is of the type disclosed in FIG. 9 of U.S. Pat. No. 3,995,258.

Also coupled to system bus 2 via an interface MBI 2-8 is a system management facility (SMF)20. A number of main memories, main memory 8 through main memory 8A are coupled to system bus 2 via interfaces MBI 2-12 through MBI 2-12A respectively. A number of peripheral controllers, peripheral controller 12 through peripheral controller 14 are coupled to system bus 2 via interfaces MBI 2-22 through MBI 2-24. Coupled to peripheral controller 12 are a number of devices 16, and coupled to peripheral controller 14 are a number of devices 18. Devices 16 through devices 18 are typically, but not limited to, keyboards, displays, communication devices, disk drives, tape drives, printers and document readers.

Each CSS includes two central processor units (CPU) with their respective virtual memory management units (VMMU) and a cache. CSS 4 includes CPU 0/VMMU 4-2, CPU 1/VMMU 4-4 and cache 4-6. CPU 0/VMMU 4-2 is coupled to system bus 2 via interfaces MRIO 2-10 and MRIC 2-30 (port 0). CPU 1/VMMU 4-4 is coupled to system bus 2 via interfaces MRI1 2-10 and MRIC 2-30A (port 1). Both CPU 0/VMMU 4-2 and CPU 1/VMMU 4-4 are coupled to port 0 and port 1, respectively, of cache 4-6. Cache 4-6 is coupled to system bus 2 via interface MRIO 2-10 through port 0 when cache 4-6 is operative with CPU 0/VMMU 4-2. Cache 4-6 is coupled to system bus 2 via interface MRI1 2-20 through port 1 when cache 4-6 is operative with CPU 1/VMMU 4-4. CSS 4 receives information from system bus 2 via interface MRIC 2-30.

The units of CSS 4A, CPU 2/VMMU 4-2A, CPU 3/VMMU 4-4A and cache 4-6A are coupled to system bus 2 in a similar manner via interfaces MRI2 2-10A, MRIC 2-30A and MRI3 2-20A.

SMF 20 controls the initialization of the system 1 as well as the monitoring a number of system and environmental functions. SMF 20 includes a watch dog timer and a real time clock which are set by commands received over system bus 2 from one of the CPU's. The SMF 20 responds when the watch dog timer or real time clock has decremented to zero by sending a corresponding command to the CPU over system bus 2 that initially set the clock. In addition, the SMF 20 monitors the power and temperature and sends commands over system bus 2 to alert the CPU's to take appropriate action. If the power or temperature changes beyond preset values, the CPU's, upon receiving the power alert or temperature alert command, respond by preparing for an orderly shutdown of the system by bringing the operating system software to a condition which will allow for an orderly restart. The SMF 20 operation is described in related application Ser. No. 869,164 entitled "System Management Apparatus for a Multiprocessor System".

System 1 is configured as a tightly coupled multi-CPU system since each CPU executes a single operating system and shares a common main memory. Therefore, each CPU may interrupt another CPU, or itself, by means of an Interprocessor Instruction. All communications between subsystems are done over the system bus 2 by means of commands and responses to commands.

The SMF 20 is positioned to give it the highest priority access to system bus 2. Since many of the commands requiring high speed access to a CPU are generated by the SMF 20, this positional priority assures a rapid response to the commands by the CPU to which the command is addressed.

A CPU will execute instructions of a process at a specified interrupt level. The CPU will interrupt the process to receive a command from system bus 2 only if the command calls for the CPU to execute a higher priority process.

When the CPU receives a command originated by another subsystem, it examines the interrupt priority level of the command and responds with an acknowledge signal over system bus 2 if the command has a higher priority than the command being executed. If the interrupt has a lower priority than the command being executed, then the CPU will respond with a not acknowledge signal. The subsystem that sends the command receives the acknowledge or not acknowledge response and takes appropriate action. If the not acknowledge response was received, the originating subsystem may send the command again over system bus 2 to the CPU. If at this time the CPU is executing a lower priority command, then the CPU will accept the command and sends an acknowledge response over system bus 2.

However, certain commands require that the receiving CPU take immediate action. Therefore, as described in this embodiment, the CPU will respond to certain commands by the logic of the invention to immediately interrupt a process currently being executed to execute the process called for by the new command. Typical of the commands requiring immediate action are those SMF 20 commands relating to time out, power or temperature change, and status change conditions. Also, certain CPU to CPU commands require immediate action. One CPU may interrupt another CPU by logic which is responsive to certain signals in the command.

Figure 2:
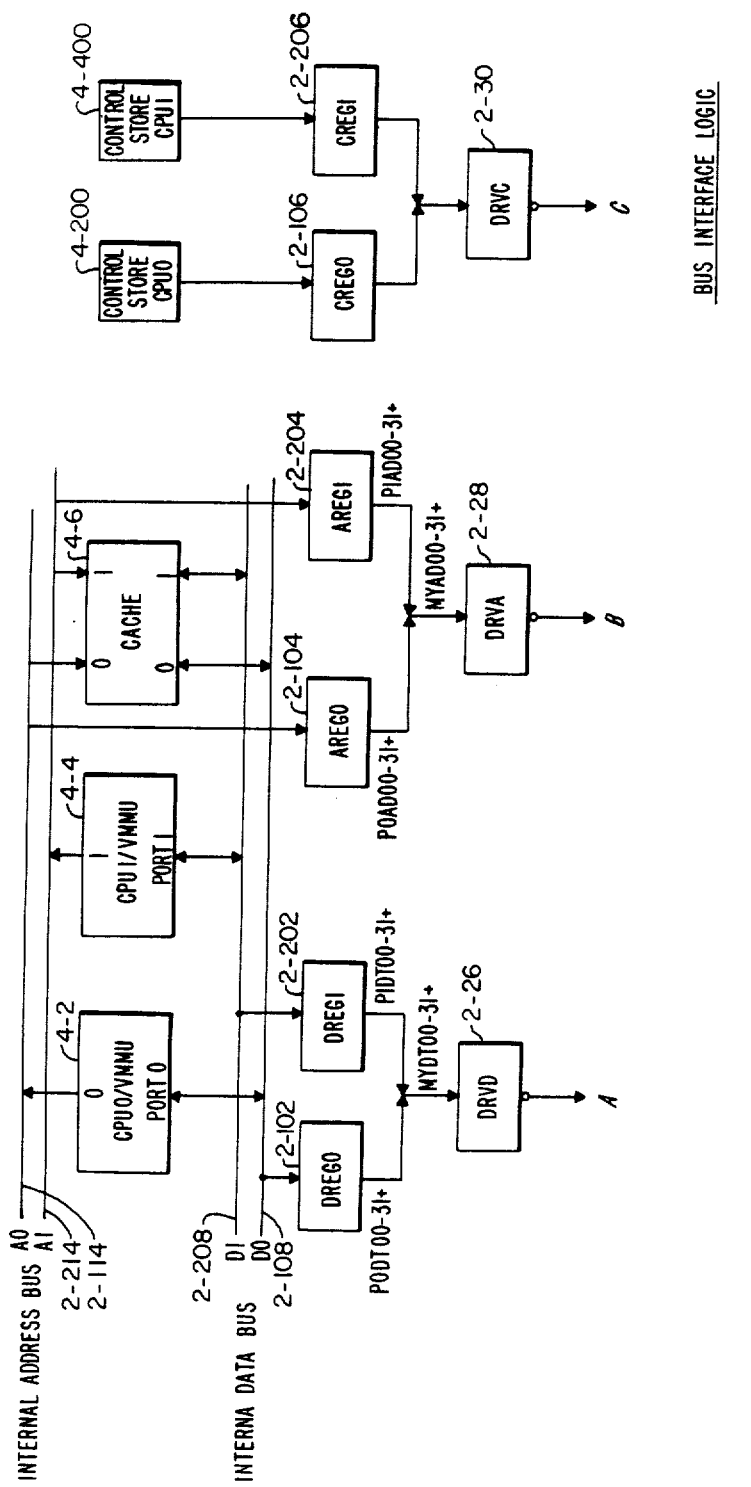
FIG. 2 (consisting of 2 sheets) shows in block diagram form the interface logic of a processing unit which includes the apparatus of the present invention.
Figure 2:
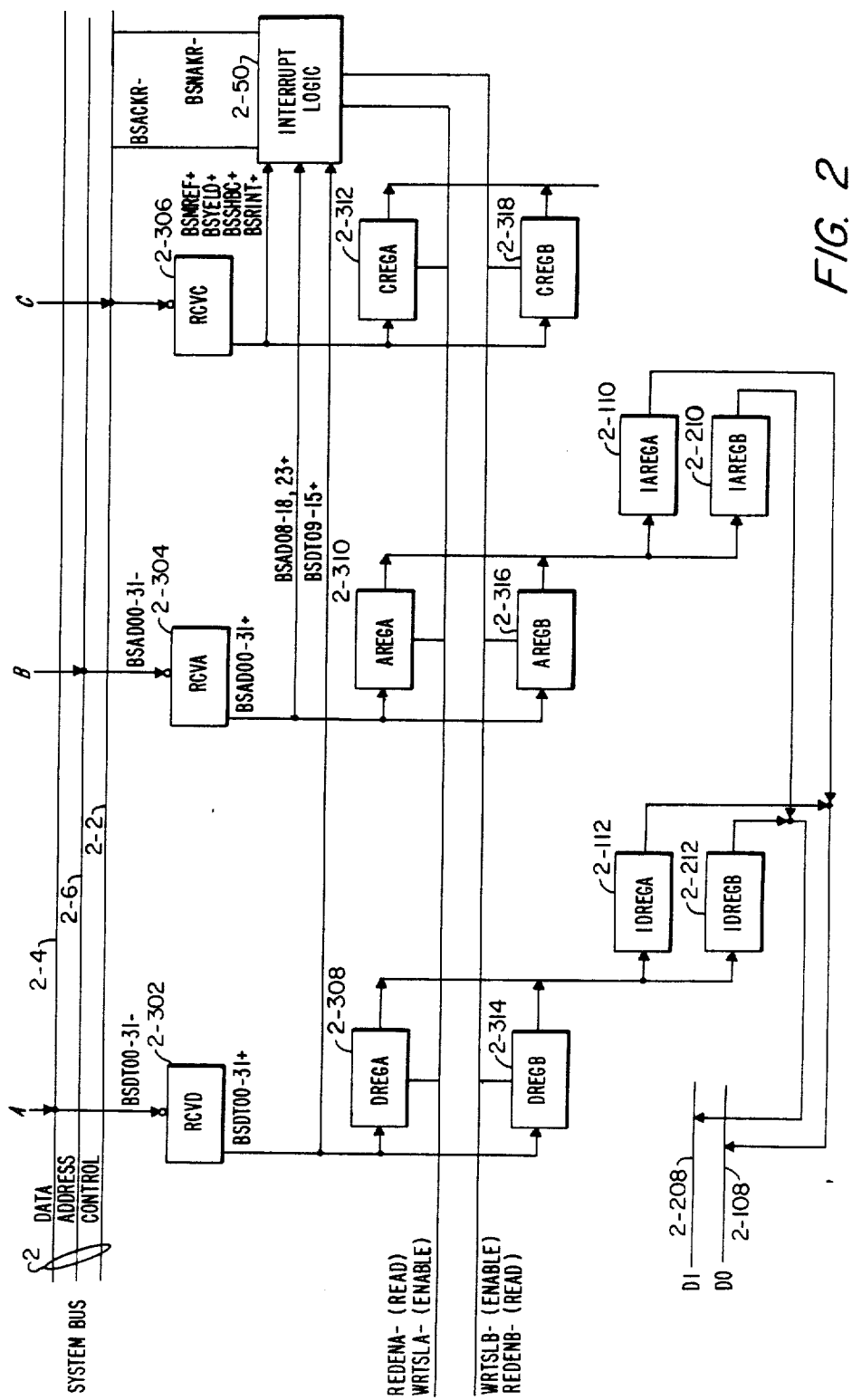

FIG. 2 shows a block diagram of interfaces MRI0 2-10, MRI1 2-20 and MRIC 2-30. Port 0 interface MRI0 2-10 logic is identified by elements 2-1XX. Port 1 interface MRI1 2-20 logic is identified by elements 2-2XX, and the common interface MRIC 2-30 logic for receiving information from system bus 2 is identified by elements 2-3XX.

System bus 2 includes a system data bus 2-4, a system address bus 2-6 and a system control bus 2-2. Data bus 2-4 includes 32 data signals BSDT00− through BSDT31− and a number of parity signals (not shown). The minus sign indicates that the signal represents a binary ONE when low and a binary ZERO when high. Address bus 2-6 includes 32 address signals BSAD00− through BSAD31− and a number of parity signals (not shown). Control bus 2-2 includes a number of control signals. Only those control signals that relate to the invention are described.

Any subsystem may request and be granted access to system bus 2 in order to transfer information to another system. The information may be in the form of a command or a response to a command. Any CPU may request and be granted access to system bus 2 to transfer information to itself, another CPU or another subsystem. Each interface receives the information and determines if the information includes an address or channel number of a unit that is coupled to that interface. If the information received by that interface does not include its channel number, then the information is ignored. Bus address signals BSAD08-17+ are decoded to form the channel number if the memory reference signal BSMREF+ indicates that the address signals BSAD00+ through BSAD31+ do not indicate a main memory location. If the information is addressed to that subsystem, then the subsystem acknowledges that it received the information by sending an acknowledge signal BSACKR− out on system bus 2.

The subsystem will accept the information provided the information has its channel number and the subsystem is not executing a process with a higher priority. If the subsystem does not accept the information because it is executing a higher priority process, then it will send a not acknowledge signal BSNAKR− out on system bus 2.

Referring to FIG. 2, interface MRIC 2-30 includes two sets of registers for receiving the command organized to operate in a first in-first out mode. Assume that the first command received by interface MRIC 2-30 is stored in the first set of receiving registers and is acknowledged, then the next command will be received by the second set of receiving registers. Meanwhile, the CPU that responded to its channel number has unloaded the command from the first set of receiving registers thereby making the receiving registers available for the next command if the command stored in the second set of receiving registers was acknowledged. If a command stored in the second set of receiving registers is not acknowledged, then the command is ignored and the next command is stored in the second set of receiving registers.

Data signals BSDT00-31− are received by 32 inverting receivers 2-302, respectively, from data bus 2-4. Assume that the data signals are stored in the first set of receiving registers. The data signals are stored in 8 registers DREGA 2-308 as signals BSDT00-31+ here the plus sign indicates that a logical ONE signal is high and a ZERO signal is low. Similarly, 32 address signals BSDA00-31− are received by 32 inverting receivers 2-304, respectively, from address bus 2-6 and stored in 8 registers AREGA 2-310 as signals BSAD00-31+, and a number of control signals are received by inverting receivers 2-306 and stored in register CREGA 2-312.

Interrupt logic 2-50 compares the channel number appearing as signals BSAD08+ through BSAD18+ with a preset channel number and also determines that the interrupt level of the command just received has a higher priority than the command being executed. Then, the acknowledge response is given and the data and address information is transferred to CPU 4-2 via registers IDREGA 2-112 and IAREGA 2-110 and internal data bus D0 2-108 if the channel number signals indicate CPU 4-2. If the channel number signals indicate CPU 4-4, then the data and address information is transferred to CPU 4-4 via registers IDREGB 2-212 and IAREGB 2-110 and internal data bus D1 2-208.

If the information does not include the channel number of CPU 4-2 or CPU 4-4, then no action is taken on the command stored in registers DREGA 2-308, AREGA 2-310 and CREGA 2-312. The next command transferred over system bus 2 is then stored in the same registers.

If a number of commands are sent to CPU 4-2 or 4-4 in succession, then the information in the first acknowledged command is stored in registers 2-308, 2-310 and 2-312 and the information in the second acknowledged command is stored in registers DREGB 2-314, AREGB 2-316 and CREGB 2-318. If a third command is received, the contents of registers 2-308, 2-310 and 2-312 will have been transferred to the addressed CPU so that registers 2-308, 2-310 and 2-312 will receive the command.

Registers 2-308, 2-310 ad 2-312 are enabled by write enable signal WRTSLA−. Registers 2-314, 2-316 and 2-318 are enabled by write enable signal WRTSLB−. Signals WRTSLA− and WRTSLB− are complementary signals and toggle during each system bus 2 cycle in which the command received is acknowledged. Read enable signal REDENA− makes the output signals of registers 2-308, 2-310 and 2-312 available and read enable signal REDENB− makes the output signals of registers 2-314, 2-316 and 2-318 available. Signals REDENA− and REDENB− are also complementary signals which toggle out of phase with the write enable signals WRTSLA− and WRTSLB−.

Control signals BSMREF+, BSYELO+, BSSHBC+, BSWRIT+ and BSRINT+ are received by interrupt logic 2-50.

Signal BSSHBC+ indicates that this command is providing information in response to a command from the subsystem that requested the information.

Signal BSRINT+ is issued by CPU to indicate that it has changed interrupt priority levels and I/O devices can attempt to resume interrupting. An I/O device that previously attempted to interrupt a CPU and got a not acknowledge will not issue any more interrupts until it detects signal BSRINTtrue on system bus 2.

Signal BSMREF+ at logical ZERO indicates that address signals BSAD08-17 represents the channel number.

Signal BSYELO+ at logical ONE and signal BSMREF+ at logical ZERO indicates that this is the highest priority command and initiates the fast interrupt operation.

CPU 0 4-2 or CPU 1 4-4 may generate commands for transfer over system bus 2 to another subsystem, another CPU or to itself.

Some of the command information may be stored in cache and if not in cache, then in main memory 8 through 8A. If the information were not in cache, then the CPU would generate a command to main memory 8 through 8A requesting the data which is stored at the location specified by the address signals BSAD00-31 in the command For this command signal, BSMREF+ would be high.

CPU 4-2 sends address signals to port 0 of cache 4-6 via internal address bus A0 2-114. CPU 4-4 sends address signals to port 1 of cache 4-6 via internal address bus A1 2-214. CPU 4-2 receives data signals from port 0 of cache 4-6 over data bus D0 2-108. CPU 4-4 received data signals from port 1 of cache 4-6 over data bus D1 2-208

Data signals from CPU 4-2 or port 0 of cache 4-6 are stored in a register DREG0 2-102 as signals P0DT00-31+ which are received via data bus D0 2-208. Data from CPU 4-4 or port 1 of cache 4-6 is stored in a register DREG1 2-202 as signals P1DT00-31+. The data signals are wire-ORed as signals MYDT00-31+ and transferred to 32 inverting drivers DRVD 2-26 for transfer over data bus 2-4 as signals BSDT00-31−.

Similarly, address signals from CPU 4-2 are stored in a register AREG0 2-104 which are received via address bus A0 2-114 as signals P0AD00-31+. Address signals from CPU 4-4 are stored in a register AREG1 2-204 which are received via address bus A1 2-214 as signals P1AD00-31+. The two sets of signals are wire-ORed as signals MYAD00-31+ and applied to address bus 2-6 via 32 inverting drivers DRVA 2-28 as signals BSAD00-31−.

Control signals from CPU 4-2 are applied to control bus 2-2 via CPU 0 control store 4-200, a register CREG0 2-106 and inverting drivers DRVC 2-30. Control signals from CPU 4-4 are applied to control bus 2-2 via CPU 1 control store 4-400, a register CREG1 2-206 and inverting drivers DRVC 2-30. The logic circuits, not shown, for transferring data, address and control signals between system bus 2 and the registers are conventional in design and may take the form as disclosed in U.S. Pat. No. 3,995,258.

The registers shown in FIG. 2 are conventional and may be constructed from 74 AS 823 logic elements manufactured by Texas Instruments.

Figure 3:
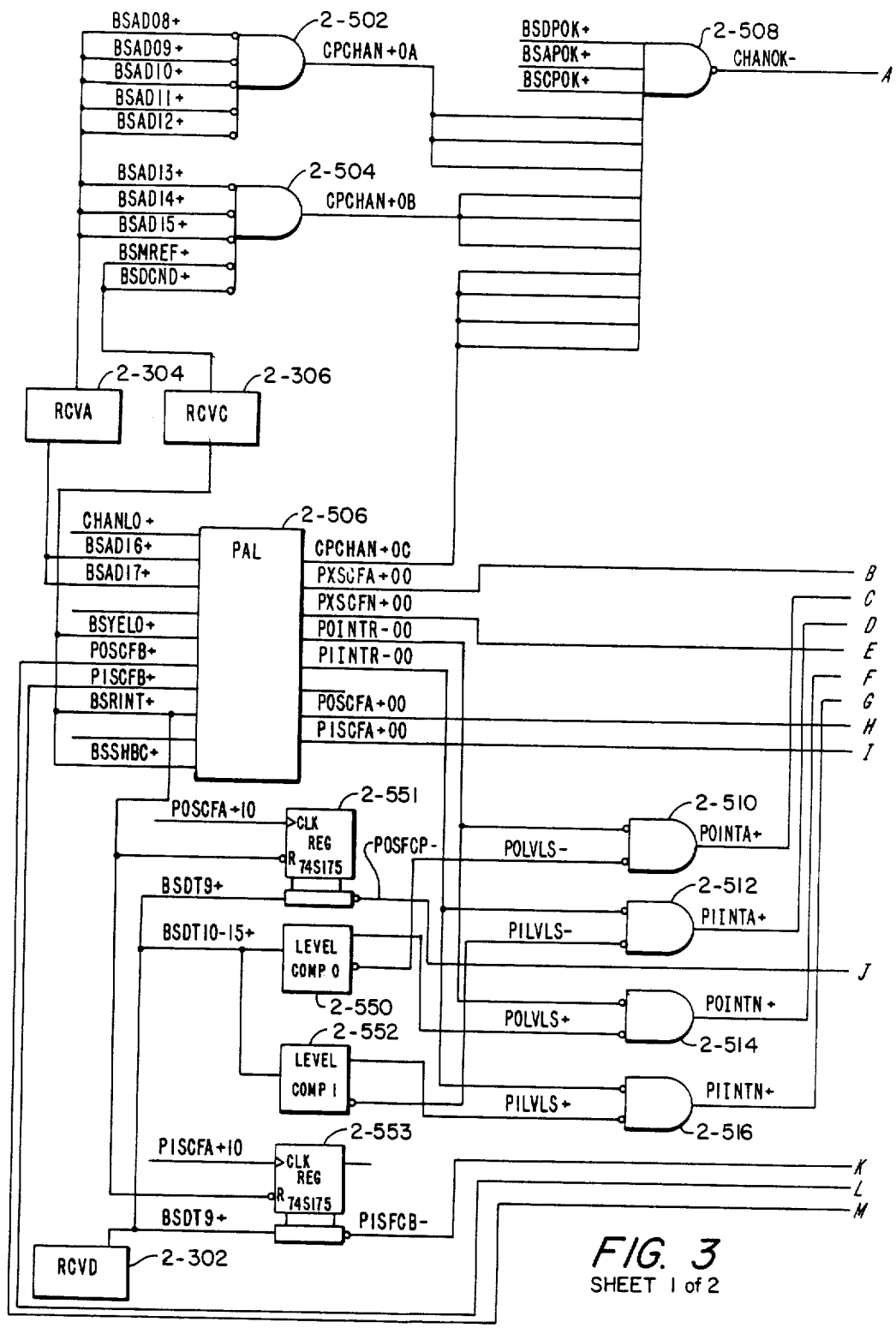
Figure 3 (consisting of 2 sheets) the detailed logic of the present invention.
Figure 3:
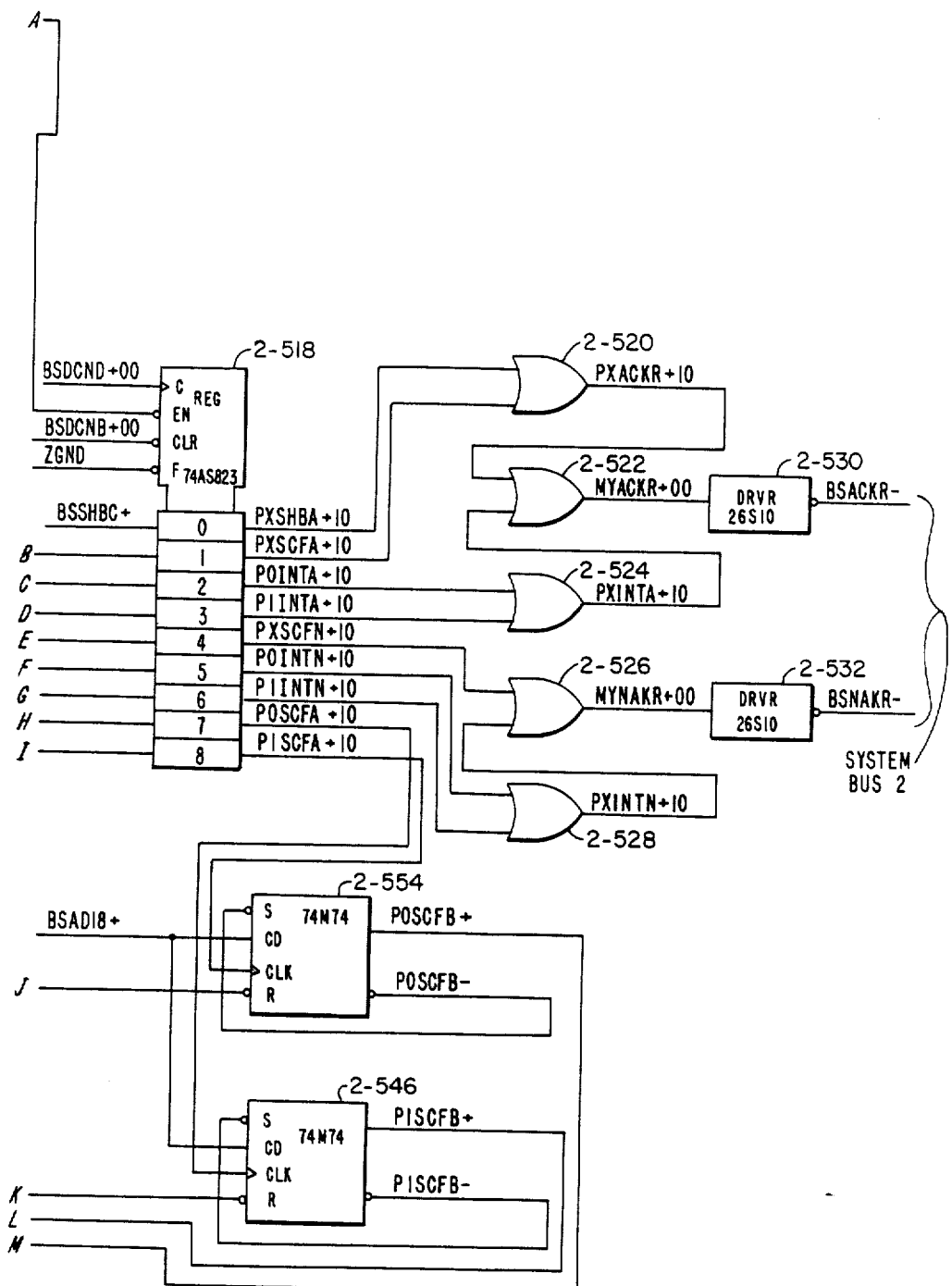

Referring to FIG. 3 which shows the detailed logic of interrupt logic 2-50. Address signals BSAD08+ through BSAD17+ identify the channel number of the receiving subsystem or CPU. The channel number of CPU 4-2 is arbitrarily assigned as hexadecimal 0000 and the channel number of CPU 1 4-4 is arbitrarily assigned as hexadecimal 0040. For the CPU 0 4-2 channel number, signals BSAD08+ through BSD17+ are at binary ZERO. For the CPU 1 4-4 channel number, signals BSAD08+ through BSAD16+ are at binary ZERO and signal BSAD17+ is at binary ONE. Note that the hexadecimal notation starts with signal BSAD00+. Therefore, signals BSAD18+ and BSAD19+ would represent the two low order bits of the next to low order hexadecimal digit and BSAD20+ through BSAD23+ represent the low order hexadecimal digit. For the purposes of the channel number indication, signals BSAD18+ and BSAD19+ are considered as binary ZERO's, however, the logic treats signals BSAD18+ and BSAD19+ as the two high order bits of the function code represented by signals BSAD18+ through BSAD23+. The function code indicates the operation that the receiving subsystem will perform as a result of acknowledging the command received over system bus 2.

The channel number signals BSAD08+ through BSAD12+ received from address bus 2-6 via receiver 2-304 are applied to a negative AND gate 2-502 and are at binary ZERO (low). Therefore, output signal CPCHAN+0A is at binary ONE (high). Also, channel number signals BSAD13+ through BSAD15+ are received from address bus 2-6 via receiver 2-304 and applied to a negative AND gate 2-504 are low, therefore, output signal CPCHAN+B is high. Signal BSMREF+ received from control bus 2-2 via receiver 2-306 is low indicating that the address signals BSAD08+ through BSAD17+ represent the channel number. Bus data signal now delayed signal BSDCND+ low indicates that the system bus 2 cycle is within the first 60 nanoseconds of the system bus 2 cycle.

Signals CHANL0+ and BSAD16+ applied to programmable array 2-506 identify this channel number as either that of CPU 0 4-2 and CPU 1 4-4 of CSS 4, or of CPU 2 4-2A or CPU 3 4-4A of CSS 4A.

For CPU 0 4-2 and CPU 1 4-4, a channel number signal BSAD16+ is low and for CPU 2 4-2A and CPU 3 4-4A, the channel number signal BSAD16+ is high. Therefore, for CPU 0 4-2 and CPU 1 4-4 both signals BSAD16+ and CHANL0+ are low, therefore, output signal CPCHAN+0C is high. Signal CHANL0+ identifies a physical slot on a backplane of systems 1 into which the board containing CSS 4A logic is plugged.

The boolean expression for signal CPCHAN+0C is:

$$\frac{(\overline{BSAD16+})(CHANL0+)+(\overline{BSAD16+})}{(\overline{CHANL0+})}.$$

Signals CPCHAN+0A, CPCHAN+0B and CPCHAN+0C, which are high, are applied to a NAND gate 2-508. Also, signals BSDPOK+, BSAPOK+ and BSCPOK+ high indicate that the information received over system buses 2-4, 2-6 and 2-2, respectively, had correct parity. Therefore, channel OK output signal CHANOK− goes low indicating that the information on system bus 2 is to be processed by either CPU 0 4-2 or CPU 1 4-4.

Signal CHANOK− enables a register 2-518 which retimes the signals applied to the input terminals on the rise of the data bus data cycle now delayed signal BSDCND+ which occurs 60 nanoseconds after the start of the system bus 2 cycle.

For the fast response to a command, signal BSYELO+ is high and signal BSMREF+ is low. Output signal PXSCFA+00 from array 2-506 high, results in an acknowledge signal BSACKR+ to be sent out on system bus 2 as signal BSACKR−. Output signal PXSCFN+00 from array 506 high, results in a not acknowledge signal BSNAKR+ to be sent out on system bus 2 as signal BSACKR−. The boolean expression for signal PXSCFA+ indicating an acknowledge response is:

$$\frac{(\overline{BSSHBC+})(BSYELO+)}{(((BSRINT+)+(\overline{BSRINT+})(BSAD17+))}$$
$$\frac{(\overline{PISCFB+}))+(\overline{BSRINT+})(\overline{BSAD17+})}{(\overline{P0SCFB+})))}.$$

Signal BSSHBC+, when low, indicates that this is not a second half bus cycle command received in response to a previous command that was sent out over system bus 2.

Signal BSRINT+ high indicates that the execution of this command will result in a level change and the acknowledge response should be given. If this is not a level change command, then signal BSRINT is low and signals BSAD17+ high and P1SCFB+ low indicate that the CPU 1 4-4 is not busy, or signals BSAD17+ low and P0SCFB+ low indicate that CPU 0 4-2 is not busy. Therefore, an acknowledge response signal BSACKR+ is sent out on system bus 2 as signal BSACKR−.

The boolean expression for signal PXSCFN+ indicating a not acknowledge response is:

$$\overline{(BSSHBC+)} (BSYELO+) ((\overline{BSRINT+})\\
(BSAD17+) (P1SCFB+) + (\overline{BSRINT+})\\
(\overline{BSAD17+}) (P0SCFB+)).$$

This indicates that if the CPU whose channel number is specified is busy, that is, the corresponding signal P0SCFB+ or P1SCFB+ is high, then a not acknowledge response signal BSNAKR+ is sent out on system bus 2 a signal BSNAKR−. Output signal P0SCFB+ from a busy flip flop 2-554 indicates, when high, that CPU 0 4-2 is busy. Output signal P1SCFB+ from a busy flip flop 2-546 indicates, when high, that CPU 1 4-4 is busy.

Flip flop 2-554 sets on the rise of signal P0SCFA+10 from register 2-518. Signal P0SCFA+ is generated by array 2-506 in accordance with the following boolean equation:

$$P0SCFA+ = (\overline{BSSHBC+}) (BSYELO+)\\
(\overline{BSAD17+})$$

Signal P0SCFA+ is retimed by register 2-518 to generate signal P0SCFA+10. Flip flop 2-554 sets on the rise of signal P0SCFA+10 since high order function code signal BSAD18+ is high for the high speed interrupt commands from SMF 20. Signal BSAD18+ may be low for some commands generated by SMF 20 during a wraparound test operation that requires the high speed interrupt since it is presumed that the CPU's are inoperative for the test. Once flip flop 2-554 is set, it remains set since output signal P0SCFB−, which is low, is applied to the set input terminals of flip flop 2-554.

Flip flop 2-554 remains set until CPU 0 4-2 has completed the execution of the command. CPU 0 4-2 then generates a command to itself which forces the reset signal P0SFCB− low. For the reset flip flop 2-554 command, data signal BSDT9+ is high and is stored in a register 2-551 on the rise of signal P0SCFA+10. Output signal P0SCFB− is forced low thereby resetting busy flop 2-554. Register 2-551 is reset by signal BSRINT+ going low at the end of the system bus 2 cycle. CPU 0 4-2 will now acknowledge a command requiring a high speed interrupt Flip flop 2-546 operates in a similar manner to flip flop 2-554 to indicate, when set, that CPU 1 4-4 is busy. CPU 1 4-4 will not acknowledge a command requiring a high speed interrupt until flip flop 2-546 is reset.

The boolean expression to generate signal P1SCFA+ is:

$$(P1SCFA+ = (\overline{BSSHBC+}) (BSYELO+)\\
(BSAD17))$$

Signal P1SCFA+ from array 2-506 is retimed by register 2-518 to generate signal P1SCFA+10. Flip flop 2-546 sets on the rise of signal P1SCFA+ since signal BSAD18+ is high. Output signal P1SCFB+, now high, is applied to array 2-506 and prevents an acknowledge response to a command with the CPU 1 4-4 channel number which requires a high speed interrupt. Signal P1SCFB− keeps flip flop 2-546 set until reset by another command by CPU 1 4-4 to itself. The command again generates signal P1SCFA+10 which stores signal BSDT9+ into a register 2-553. Reset signal P1SFCB− is forced low thereby resetting flip flop 2-553. Signal BSRINT+ then resets register 2-553 at the end of the system bus 2 cycle when it goes low.

The acknowledge signal for the fast interrupt which is generated by signal PXSCFA+ is applied to an OR gate 2-520 to generate signal MYACKR+ via output signal PXACKR+ and an OR gate 2-522. Signal MYACKR+ is applied to a driver 2-530 to generate signal BSACKR− over system bus 2.

Similarly, the not acknowledge signal BSNAKR− is generated by signal PXSCFN+, register 2-518, signal PXSCFN+10, an OR gate 2-526, signal MYNAKR+, a driver 2-532, and system bus 2 signal BSNAKR−.

Signal MYACKR+ also causes the command received from system bus 2 and stored in registers 2-308, 2-310, and 2-312, FIG. 2 to remain in the registers for subsequent execution by generating signal WRTSLB−. The next command is stored in registers 2-314, 2-316 and 2-318. If that command is acknowledged, then complementary signal WRTSLA− is generated and registers 2-308, 2-310 and 2-312 are available.

The normal system bus 2 interrupt operation is initiated by signal BSYELO+ of the command that was received being low. In this case, signal P0INTR− from array 2-506 is generated if the information on system bus 2 is to interrupt CPU 0 4-2 or signal P1INTR− is generated if the information on system bus 2 is to interrupt CPU 1 4-4.

The boolean expressions are:

$$P0INTR- = (\overline{BSSHBC+}) (\overline{BSYELO+})\\
(\overline{BSAD17+}) \; P1INTR = (\overline{BSSHBC+})\\
(\overline{BSYELO+}) (BSAD17+)$$

Signal P0INTR− is applied to an input terminal of negative AND gates 2-510 and 2-514. Signal P0LVLS− is applied to the other terminal of negative AND gate 2-510 and signal P0LVLS+ is applied to the other terminal of negative AND gate 2-514.

Similarly, signal P1INTR− is applied to an input terminal of negative AND gates 2-512 and 2-516. Signal P1LVLS− is applied to the other terminal of negative AND gate 2-512 and signal P1LVLS+ is applied to the other terminal of negative AND gate 2-516.

Signal P0LVLS−, when low, indicates that CPU 0 4-2 is executing a lower priority routine and an acknowledge response is sent over system bus 2.

Signal P1LVLS−, when low, indicates the CPU 1 4-4 is executing a lower priority routine and the acknowledge response is sent over system bus 2.

Signal P0LVLS+ or signal P1LVLS+, when low, indicates that CPU 0 4-2 or CPU 1 4-4, respectively, are executing a higher priority routine and a not acknowledge response is sent over system bus 2.

Output signals P0INTA+, P0INTN+ and P1INTN+ from negative AND gates 2-510, 2-512, 2-514 and 2-516, respectively, are stored in register 2-518.

For the acknowledge response, if either one of signals P0INTA+ or P1INTA+ which are applied to an OR gate 2-524 are high, then the BSACKR— signal is generated as before via driver 2-530, signal MYACKR+, OR gate 2-522 and signal PXINTA+. For the not acknowledge response, if either signals P0INTN+ or P1INTN+ which are applied to an OR gate 2-528 then the BSNAKR— signal is generated via driver 2-532, signal MYNACKR, OR gate 2-526 and signal PXINTN+.

The priority level comparison for CPU 0 2-4 is made by level comparator 0 2-550. The priority level comparison for CPU 1 4-4 is made by level comparator 1 2-552. Comparator 0 1-550 stores the priority level of the routine being executed by CPU 0 4-2 and comparator 1 2-550 stores the priority level of the routine being executed by CPU 1 4-4. The interrupt priority level of the new command is applied to comparators 2-550 and 2-552 as data signals BSDT10-15+.

Both comparators 2-550 and 2-552 compare the incoming interrupt priority level represented by data signals BSDT10-15+ with the interrupt priority levels stored in the respective comparators. Signal P0LVLS— low indicates that the interrupt priority level of the new command is higher tan the interrupt priority level of the command being executed by CPU 0 4-2. Signal P1LVLS— low indicates that CPU 1 4-4 is executing a lower interrupt priority level command. Signals P0LVLS— and P1LVLS— are applied to negative AND gates 2-510 and 2-512, respectively.

Signal P0LVLS+ low indicates that CPU 0 4-2 is executing a higher interrupt priority level command than interrupt priority level of the new command. Signal P1LVLS+ low indicates that CPU 1 4-2 is executing a higher interrupt priority level command than the interrupt priority level of the new command. Signals P0LVLS+ and P1LVLS+ are applied to negative AND gates 2-514 and 2-516, respectively.

Signal P0INTR— from array 2-506 is applied to negative AND gates 2-510 and 2-514 to select signal P0LVLS—, if low, to generate signal P0INTA+ from negative AND 2-510 to indicate an acknowledge response; or to select signal P0LVLS+, if low, to generate signal P0INTN+ from negative AND gate 2-514 to generate a not acknowledge response.

Signal P1INTR— from array 2-506 is applied to negative AND gate 2-512 and 2-516 to select signal P1LVLS—, if low, to generate signal P1INTA+ for an acknowledge response, or select signal P1LVLS—, if low, to generate signal P1INTR+ for a not acknowledge response.

Signals P0INTA+, P1INTA+ and P0INTN+ are stored in register 2-518. Output signals P0INTA+10 and P1INTA+10 are applied to an OR gate 2-524 to generate the acknowledge signal MYACKR+ via signal PXINTA+ and OR gate 2-522. Signals P0INTN+10 and P1INTN+10 are applied to an OR gate 2-528 to generate the not acknowledge signal MYNAKR+ via signal PXINT1+10 and OR gate 2-526.

The logic elements of FIG. 3 are conventional in design and described in the TTL Data Book for Design Engineers, Second Edition, and published by Texas Instruments.

The level change operation is described in related application, Ser. No. 879,858.

FIG. 4 shows the layouts of the data address and address fields and the pertinent control signals in the control field of the command. For the normal interrupt, the control signals memory reference signal BSMREF+, second half bus cycle signal BSSHBC+, the bus yellow fast interrupt signal BSYELO+, and the resume interrupting signal BSRINT are all low. The address signals BSAD08-17+ indicate the channel number of the destination CPU. Address signals BSAD18-23 give the function code. The data signals BSDT00 09 provide the channel number of the source. Data signals BSDT10-15+ indicate the interrupt priority level number of the command.

For a CPU interrupt level change command signal BSRINT+ is high. Address signals BSAD08-17+ again indicate the channel number of the destination CPU. Address signals BSAD18-23+ provide the function code indicating a level change. Data signals 00-09+ give the channel number of the source CPU since level changes are initiated by a CPU and data signals 10-15+ provide the new interrupt priority level.

For the high speed interrupt control signal BSYELO+ is high. Address signals BSAD08-17 indicate the channel number of the destination CPU. Address signals BSAD18-23+ give the function code with the high order bit BSAD18+ being high and data signals BSDT00-09 provide the channel number of the source, hexadecimal OF for the SMF20.

For the reset high speed interrupt busy command, control signals BSYELO+ and BSRINT are high. The CPU that is resetting its busy flip flop generates its own channel number and data signal BSDT9+ high. CPU 0 4-2 sends out this command to reset flip flop 2-554 and CPU 4-4 sends out the command with its channel number to reset flip flop 2-546. Resetting the flip flops allows the CPU's to receive the next high speed interrupt command.

While the invention has been shown and described with reference to the preferred embodiment thereof, it will be understood by those skilled in the art that the above and other changes in form and detail may be made therein without departing from the spirit and scope of the invention.

What is claimed is:

1. A data processing system wherein an emergency or top priority interrupt signal will by-pass a priority-level comparison to access an addressed processing unit, comprising:
  a plurality of interrupting units and a plurality of processing units coupled in common to a system bus for asynchronously transferring commands between said plurality of interrupting units and each of said plurality of processing units during different bus cycles of operation, and further including:
  command generating means coupled to said bus for applying commands to said bus during bus cycles of operation granted to said processing units, each of said commands including an address field coded to specify a channel number indicating an address of a processing unit to receive said command, said command further including a control field including a memory reference signal indicating that said address field is coded to specify said channel number, and an interrupt type signal in a first state specifying a normal interrupt or an interrupt type signal in a second state specifying a fast interrupt, said fast interrupt, second state signal by-passing a priority level comparison and directly accessing an addressed processing unit; channel decoder means coupled to said bus for generating an output signal upon detecting that said channel number is assigned to said processing unit and said memory reference signal has been applied to said bus by a respective one of said processing units;

logic array means coupled to said bus and said channel decoder means and responsive to said interrupt type signal in said second state specifying said fast interrupt, said output signal and a busy signal in a first state generated by a flip flop means for generating both a first acknowledge signal indicating that said processing unit is executing said command, and a set busy signal, said logic array means being further responsive to said interrupt type signal in said first state specifying said normal interrupt and said output signal for generating a compare signal;

comparison means coupled to said bus and said logic array means and responsive to said compare signal, said comparison means comparing a current interrupt priority level with a priority level of a command already being executed by a processing unit, and in response thereto, generating a second acknowledge signal if said current interrupt priority level is greater than said executed command interrupt priority level and generating a second not acknowledge signal if said current interrupt priority level is not greater than said executed command interrupt priority level;

busy means coupled to said bus and said logic array means and including said flip flop means responsive to an address signal included in said command and said set busy signal for generating said busy signal in a second state;

said logic array means being further coupled to said bus, said channel decoder means and said busy means and responsive to said interrupt type signal in said first state, said output signal from a subsequent command and said busy signal in said second state for generating a first not acknowledge signal indicating that said processing unit is not executing said command; and response means coupled to said logic array means and said bus and responsive to said first acknowledge signal for sending an acknowledge response signal to said interrupting unit associated with said fast interrupt signal, and responsive to said first not acknowledge signal for sending a not acknowledge response signal to said interrupting unit associated with said normal interrupt signal, said response means further coupled to said comparison means and said bus and responsive to said second acknowledge signal for generating a second acknowledge response signal, and responsive to said second not acknowledge signal for generating a second not acknowledge response signal.

2. The system of claim 1 wherein said array means is responsive to both said interrupt signal in said second state and a reset bus command generated by said command generating means to generate said set busy signal.

3. The system of claim 1 wherein said busy means comprises:

register means coupled to said logic array means and said bus and responsive to said set busy signal and a data signal from a reset command generated by said command generating means for generating a reset flip flop signal;

said flip flop means coupled to said register means and responsive to said reset flip flop signal for generating said busy signal in said first state.

4. The system of claim 1 wherein said response means comprises:

first register means coupled to said channel number decoder means and said logic array means, and responsive to said output signal for storing an acknowledge signal and said set busy signal specifying an acknowledge response of a second command and storing a not acknowledge signal specifying a not acknowledge response of said second command.

5. The system of claim 4 wherein said array means is responsive to said interrupt type signal in said second state to generate said set busy signal, said set busy signal being stored in said first register means.

6. The system of claim 5 wherein said decoder means further comprises:

second register means coupled to said first register means and said bus and responsive to said set busy signal and a data signal for generating a busy flip flop reset signal.

7. The system of claim 6 wherein said flip flop means is responsive to said busy flip flop reset signal for generating said busy signal in a first state.

8. The system of claim 4 wherein said first register means is further coupled to said comparison means for receiving said comparison signals for storing a second acknowledge signal from said comparison means if said comparison signals indicate that said current interrupt level is less than said interrupt level of a first command, and storing a second not acknowledge signal from said comparison means if said comparison signals indicate that said current level is not less than an interrupt level of said first command.

indicating that said second command is being executed by said processing unit.

9. The system of claim 8 wherein said response means further comprises:

first OR gate means coupled to said first register means and responsive to said first acknowledge signal for generating a first one of a number of signals on said bus.

10. The system of claim 9 wherein said first OR gate means is responsive to said second acknowledge signal from said comparison means for generating said first one of said number of signals on said bus indicating that said first command is being executed by said processing unit.

11. The system of claim 8 wherein said response means further comprises:

second OR gate means coupled to said first register means and responsive to said first not acknowledge signal for generating a second of said number of signals on said bus indicating that said second command is not being executed by said processing unit.

12. The system of claim 11 wherein said second OR gate means is responsive to said second not acknowledge signal from said comparison means for generating said second of said number of signals on said bus indicating that said first command is not being executed by said processing unit.

* * * * *